United States Patent [19]

Meighan

[11] 4,331,516

[45] May 25, 1982

[54] CURING OF TETRABASIC LEAD PASTED BATTERY ELECTRODES

[75] Inventor: Richard M. Meighan, Lansdale, Pa.

[73] Assignee: Eltra Corporation, Toledo, Ohio

[21] Appl. No.: 212,648

[22] Filed: Dec. 3, 1980

[51] Int. Cl.$^3$ ............................................. H01M 10/44
[52] U.S. Cl. .................................. 204/2.1; 427/126.3; 427/374.1; 427/377; 427/380; 429/227; 29/623.5
[58] Field of Search ................... 427/126.3, 374.1, 377, 427/380; 429/227; 29/623.5; 204/2.1

[56] References Cited

U.S. PATENT DOCUMENTS 3,765,943 10/1973 Biagetti ................................ 429/227
3,899,349 8/1975 Yarnell ................................ 264/345

FOREIGN PATENT DOCUMENTS 625977 8/1961 Canada ................................ 429/277
726810 1/1966 Canada ................................ 429/227

Primary Examiner—John D. Smith
Assistant Examiner—Richard Bueker
Attorney, Agent, or Firm—James P. DeClercq

[57] ABSTRACT

A process for the fabrication of lead acid batteries containing an acid electrolyte and negative electrodes and positive electrodes, including the steps of coating at least one said electrode with a paste containing tetrabasic lead sulfate and ammonium carbonate mixed with water, curing said electrode in a dry atmosphere, and forming said electrode.

5 Claims, No Drawings

CURING OF TETRABASIC LEAD PASTED BATTERY ELECTRODES

CROSS REFERENCE TO RELATED APPLICATIONS

This application is related to U.S. Ser. No. 212,480, filed Dec. 3, 1980, entitled "CURING OF TETRABASIC LEAD PASTED BATTERY ELECTRODES".

BACKGROUND OF THE INVENTION

The use of tetrabasic lead sulfate, chemical formula $4PbO.PbSO_4$, has been determined to be a useful starting material for the preparation of positive electrodes for use in lead-acid batteries. As disclosed in U.S. Pat. No. 3,765,943, issued to Biagetti on Dec. 9, 1970, entitled "FABRICATION OF LEAD-ACID BATTERIES", and in U.S. Pat. No. 3,899,349, issued to Yarnell on Aug. 12, 1975, entitled "CARBON DIOXIDE CURING OF LEAD-ACID BATTERIES", hereby incorporated by reference, battery plates or electrodes fabricated with tetrabasic lead sulfate and cured in a particular manner in the presence of a controlled amount of carbon dioxide gas, produces an increased product yield, greater life, greater reproducibility in the chemical and physical properties of the product, and crystal morphology more suitable to battery operation. It should be noted that both positive and negative electrodes may be formed with tetrabasic lead sulfate, although it is preferred that tetrabasic lead sulfate be used only for positive plates. In forming or charging a battery, the desired result is a positive plate having lead dioxide as the active material, and a negative plate or electrode having metallic lead as the active material. It has been found, for negative plates and electrodes, more practical to start with a mixture of lead oxides containing approximately 30% metallic lead particles.

The preparation of active electrodes or plates for lead acid batteries involves three steps. First, a paste is applied to a supporting grid, the pasted grid is dried and cured, and the cured grid is formed to produce the active materials used in the charged lead-acid battery. Formation is usually by electrolyte formation, by passing current through the electrode, the desired result being a positive plate having pellets of lead dioxide, and a negative plate having pellets of metallic lead.

Tetrabasic lead sulfate, unlike prior materials used for pasting battery electrodes or plates, is non-reactive. It contains no acid, and is not self-hardening.

It has been stated that the only parameters relevant to paste mixing are the amounts of tetrabasic lead sulfate and water, and the length of time mixed, by C. F. Yarnell, abstract No. 32, issued Oct., 1974, New York, Electrochemical Society Meeting.

When the water is first added the mix appears very dry. After continued mixing, the mixture starts to form into small balls, these small balls coalescing into larger balls until the mixture becomes a single mass. As the paste is mixed beyond this point, it becomes more fluid, eventually becoming too fluid to use, regardless of the amount of water used to make the paste, as long as a minimum amount is used.

The paste is then applied to an electrode, typically in the form a gridwork formed of metallic lead or a lead alloy, and dried and hardened.

The overall problem is maintaining sufficient mechanical strength in the pasted electrodes to survive handling and forming. Plates may become damaged either by accidental rough handling or may tend to disintegrate, either by popping pellets of material, or by shedding material while being formed, typically in a dilute sulfuric acid electrolyte. If this occurs, in initial forming, or in charging in use, battery performance and life expectancy is diminished, the loose material forming shorts between plates, either directly, or as it builds up on the bottom of a battery, and the electrode becomes more porous, having poor contact with the underlying grid.

After drying, the prior art hardening process for plates or electrodes formed from tetrabasic lead sulfate paste requires carbon dioxide and water. It is essential to such a procedure that the pasted electrode be exposed to an atmosphere of carbon dioxide while water in the form of water vapor, of at least 35 percent relative humidity, is in contact with the paste material.

A preferred prior method includes drying the plates or electrodes, then curing them in an atmosphere of 50 percent relative humidity containing 20 percent carbon dioxide gas.

SUMMARY OF THE INVENTION

As will be apparent, maintaining necessary process times, water vapor and carbon dioxide gas concentrations, and temperatures in production is difficult, resulting in a high scrap rate for the positive plates or electrodes of batteries such as disclosed in U.S. Pat. No. 3,899,349, in spite of efforts to reduce the variability of the quality of the resulting battery plates or electrodes.

It is a primary object of the invention to provide a method of preparing battery plates or electrodes from tetrabasic lead sulfate paste including the step of adding a carbonate material to the tetrabasic lead sulfate paste, to provide an easily controlled amount of carbon dioxide for the curing of such plates. It has been found that ammonium carbonate, in a specific range of concentrations, produces desirable results.

It is a further primary object of the invention to provide a method of curing battery plates or electrodes which does not require that significant water vapor be in contact with the paste material of the plates or electrodes. It is an advantage of the invention that battery plates or electrodes formed with tetrabasic lead sulfate may be rapidly and economically dried and cured without maintaining any fixed relative humidity of drying and curing atmospheres. In accordance with the invention, plates or electrodes may be rapidly dried and cured in a dry atmosphere at first and second elevated temperatures, or economically at a single temperature which may be, but need not be, an elevated temperature. It is believed that an acceptable cure according to the invention may be attained at any temperature above the freezing point of water, it being believed that freezing would result in an undesirable increase in porosity of such plates and electrodes.

It is believed that water and carbon dioxide are both necessary for an acceptable cure, prior methods using externally applied water vapor to assist the operation of externally applied gaseous carbon dioxide, it being also believed that the invention provides an internal source of carbon dioxide, making the internal water of wet pasted plates usable to provide the necessary moisture.

It is essential to the invention that a carbonate material, in powder form, be mixed with the water and the tetrabasic lead sulfate, to provide an inherent source of the carbon dioxide necessary for a desirable cure of a battery electrode or plate.

Three different inorganic carbonates have been added, in particular amounts, to tetrabasic lead sulfate in making a battery paste.

Plates were formed with pastes made by adding 45 grams of sodium bicarbonate ($NaHCO_3$), sodium carbonate ($Na_2CO_3$), and ammonium carbonate [$(NH_4)_2CO_3$], respectively, being dissolved into 450 milliliters of water, which was then flooded into 5 pounds (2281 gm) of dry tetrabasic lead sulfate and mixed for 100 seconds. The three resulting batches of paste were then applied to standard grids, which were cured at 100% relative humidity at 140° F. for three hours, and subsequently dried at 220° to 250° F. for 16 hours. Upon introduction into dilute sulfuric acid ($H_2SO_4$) having a specific gravity of 1.005, the sodium bicarbonate and sodium carbonate plates popped pellets, but the ammonium carbonate plates was substantially unaffected. It was then found possible to form the plate containing ammonium carbonate to a completed positive plate or electrode with a 4 ampere current for 96 hours. It was not established that sodium bicarbonate, sodium carbonate, or any other carbonate would be nonfunctional for this purpose in a concentration other than that actually tested. In view of later test results, it appears that the amount of ammonium carbonate used is somewhat critical, the invention itself being the use of a carbonate added to tetrabasic lead sulfate paste for making battery electrodes to provide carbon dioxide for an efficient cure of the electrodes.

As shown in tables 1 and 1a, below, ammonium carbonate was added to tetrabasic lead sulfate in amounts ranging between 0.2% and 3.4%, and pasted plates or electrodes were cured in two different manners, a first method involving a humid atmosphere for at least part of the cure, and a second method using two different elevated temperatures. Based on the results of these tests, it appears that simple air-drying, although consuming additional time, is also advantageous.

As shown in tables 1 and 1a below, seven different mixtures, including a control mixture, cured with carbon dioxide gas, were tested. For the cure labeled "cure I", the wet pasted plates were placed in a humidity cabinet at 140° F. at approximately 100% relative humidity for three hours, then dried at 160° F. for 16 hours at approximately 10% relative humidity. In a second procedure, labeled "cure II", the wet pasted plates were placed directly in a 130° F. room for 16 hours, followed by 16 hours at 160° F. The control cure was a standard laboratory 20% carbon dioxide, 50% relative humidity process. The plates were then formed in dilute sulfuric acid of 1.005 specific gravity. Tables 1 and 1a tabulate the amount of popping of pellets observed, the amount of shedding observed, and the relative observed formation rate. Tables 1 and 1a also tabulate the weight change measured following formation for plates cured in two different manners and by standard laboratory cure, and also tabulates the capacity in ampere hours for a ;2 amp discharge for the fifth consecutive time in a cycling test for cure I and combined cures I and II.

TABLE I

| MIX-TURE | % WEIGHT $(NH_4)_2 CO_3$ ADDED | POPPING | SHEDDING | FORMATION RATE |
|---|---|---|---|---|
| A | 3.4% | moderate | mod-severe | mod.fast |
| B | 2.8% | moderate | mod.severe | mod.fast |
| C | 2.2% | none | slight | fast |
| D | 1.6% | none | slight | fast |

TABLE I-continued

| MIX-TURE | % WEIGHT $(NH_4)_2 CO_3$ ADDED | POPPING | SHEDDING | FORMATION RATE |
|---|---|---|---|---|
| E | 1.0% | none | slight | fast |
| F | 0.2% | severe | severe | moderate |
| G | 0.0% | none | slight | mod.fast |

TABLE Ia

| MIX-TURE | CURE I | % WEIGHT CHANGE CURE II | STD. LAB. CURE | CAPACITY (AH) 12A DISCHARGE 5th DISCHARGE |
|---|---|---|---|---|
| A | −1.0 | −3.8 | — | — |
| B | −0.8 | −2.7 | — | — |
| C | −0.8 | −1.8 | — | 53.1* |
| D | −0.7 | −1.1 | — | 52.8* |
| E | −0.3 | −0.7 | — | 42.6** |
| F | −2.9 | −0.1 | — | — |
| G | — | — | +0.4 | 49.9 |

*Average of two cells (2 positive plates per cell, all cure I)
**One cell (1 positive plate cure I + 1 positive plate cure II)

It has been found that both procedures effect a satisfactory cure. The main advantage of either procedure over a gaseous $CO_2$ cure is reliability. Plates produced by both subject procedures were observed to have lost a small but measurable amount more active material, about 0.5% during formation, than the control plates cured with gaseous carbon dioxide. It was found that slightly less material was lost using the high humidity curing environment of cure I. Plate capacity and cycle life were also found to be somewhat less than that obtained using a gaseous carbon dioxide cure for the control plates, about 1% for cell capacity and 5% for cycle life, and also slightly less for the result of cure II than for cure I, although not to a significant extent. This is believed to result from the greater loss of active material during forming. However, either procedure produces a more repeatable and reliable battery over the result of the production variations found to exist for a high humidity, gaseous carbon dioxide cure.

As shown in table 1 and 1a, only mixtures C, D. and E were found satisfactory, and formed slightly faster than the control, mixture G. Mixture E, which was actually 45 grams of ammonium carbonate to 10 pounds (4563 gm) of tetrabasic lead sulfate, or approximately a 1% mixture, having lower weight change with only slightly less capacity.

It will be obvious to one skilled in the art to modify and vary the present invention, without departing from the spirit and scope of the invention.

I claim:

1. A process for the fabrication of lead acid batteries containing an acid electrolyte and negative electrodes and positive electrodes, including the steps of coating at least one said electrode with a paste containing tetrabasic lead sulfate and an effective amount of ammonium carbonate mixed with water, curing said electrode in a dry atmosphere, and forming said electrode.

2. A process according to claim 1, wherein said step of curing said electrode in a dry atmosphere is performed at an elevated temperature.

3. A process according to claim 1, including a step of drying said plate.

4. A process according to claim 2, wherein said step of curing said electrode is performed at a first elevated temperature and said step of drying said electrode is performed at a second elevated temperature, said first elevated temperature being lower than said second elevated temperature.

5. A process according to claim 3, wherein said first elevated temperature is about 130 degrees Fahrenheit, and said second elevated temperature is about 160 degrees Fahrenheit.

* * * * *

UNITED STATES PATENT AND TRADEMARK OFFICE
CERTIFICATE OF CORRECTION

PATENT NO. : 4,331,516
DATED : May 25, 1982
INVENTOR(S) : Richard M. Meighan

It is certified that error appears in the above–identified patent and that said Letters Patent are hereby corrected as shown below:

```
Column 1, line 64, before "a gridwork" insert --of--.
Column 3, line 59, change ";2" to --12--.
Column 4, line 37, change "D." to --D,--.
```

Signed and Sealed this

Thirtieth Day of November 1982

[SEAL]

Attest:

GERALD J. MOSSINGHOFF

Attesting Officer  Commissioner of Patents and Trademarks